United States Patent
Meenakshisundaram et al.

(10) Patent No.: US 12,443,493 B2
(45) Date of Patent: Oct. 14, 2025

(54) ADAPTIVE REPLACEMENT OF CXL MEMORY DEVICE

(71) Applicant: Hewlett Packard Enterprise Development LP, Spring, TX (US)

(72) Inventors: Renganathan Meenakshisundaram, Karnataka (IN); Lavanya Munivenkatappa, Karnataka (IN); Pawan Kumar, Karnataka (IN); Rupa Ramakrishna, Karnataka (IN); Mohan Parthasarathy, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/589,869

(22) Filed: Feb. 28, 2024

(65) Prior Publication Data

US 2025/0138963 A1 May 1, 2025

(30) Foreign Application Priority Data

Oct. 27, 2023 (IN) .............................. 202311073379

(51) Int. Cl.
| | |
|---|---|
| G06F 11/00 | (2006.01) |
| G06F 11/07 | (2006.01) |
| G06F 11/10 | (2006.01) |
| G06F 11/16 | (2006.01) |

(52) U.S. Cl.
CPC ...... *G06F 11/1658* (2013.01); *G06F 11/0784* (2013.01); *G06F 11/1016* (2013.01)

(58) Field of Classification Search
CPC ............. G06F 11/1658; G06F 11/0784; G06F 11/1016; G06F 11/073; G06F 11/2023; G06F 11/203; G06F 11/2069; G06F 11/2056; G06F 11/2082; G06F 11/2094
See application file for complete search history.

(56) References Cited

U.S. PATENT DOCUMENTS

| | | | | |
|---|---|---|---|---|
| 10,768,965 | B1 * | 9/2020 | Habusha | G06F 9/45558 |
| 2011/0264880 | A1 * | 10/2011 | Ylonen | G06F 12/0261 |
| | | | | 711/170 |
| 2018/0136971 | A1 * | 5/2018 | Dong | G06F 9/45558 |

(Continued)

OTHER PUBLICATIONS

CXL, "CXL® Specification—Compute Express Link", available online at <https://computeexpresslink.org/cxl-specification/>, 2024, 7 pages.

(Continued)

*Primary Examiner* — Joseph D Manoskey
(74) *Attorney, Agent, or Firm* — Yao Legal Services, Inc.

(57) ABSTRACT

One aspect of the instant application can provide a system and method for replacing a faulty or failing memory device during runtime. During operation, a host device of a plurality of coupled memory devices can detect an error-containing memory device and select, from a pool of standby memory devices, a replacement memory device. The host device can migrate data from the error-containing memory device to the replacement memory device during runtime of applications executing on the host device, replicate host physical address (HPA) address-mapping from the error-containing memory device to the replacement memory device, and replace the error-containing memory device with the replacement memory device.

20 Claims, 8 Drawing Sheets

(56) References Cited

U.S. PATENT DOCUMENTS

| | | | |
|---|---|---|---|
| 2022/0004468 A1* | 1/2022 | Willhalm | G06F 11/203 |
| 2023/0401120 A1* | 12/2023 | Gim | G06F 11/073 |
| 2024/0012713 A1* | 1/2024 | Steinmetz | G06F 11/1415 |
| 2024/0176739 A1* | 5/2024 | Alden | G06F 11/2025 |
| 2024/0231615 A1* | 7/2024 | Choi | G06F 3/0608 |
| 2024/0403157 A1* | 12/2024 | Kotary | G06F 9/45558 |

OTHER PUBLICATIONS

Google Cloud Blog, "Mitigating memory errors for your SAP environment", available online at <https://cloud.google.com/blog/products/sap-google-cloud/mitigating-memory-errors-for-your-sap-environment>, Sep. 4, 2021, 13 pages.

Intel, "CXLType 3 Memory Device Software Guide", Jul. 2021, Revision 1.0, 121 Pages.

* cited by examiner

ADAPTIVE REPLACEMENT OF CXL MEMORY DEVICE

BACKGROUND

Field

This disclosure is generally related to the management of memory devices. More specifically, this disclosure is related to runtime replacement of a faulty memory device.

BRIEF DESCRIPTION OF THE FIGURES

In the figures, like reference numerals refer to the same figure elements.

DETAILED DESCRIPTION

Reliability, Availability, and Serviceability, often referred to as RAS, are three important aspects of a computer server system's design that affect its ability to operate continuously and to minimize the time necessary to service the system. Customers often aim to deploy mission-critical workloads on servers that can provide a high level of RAS. When faults do occur, a high RAS system can implement fast recovery mechanisms to reduce unplanned downtime.

Memory errors are a common type of hardware failure in computer server systems and can negatively affect the RAS aspects of the system. The explosive growth of the Internet content and the resulting data storage and computation requirements have resulted in the deployment of heterogeneous and complex solutions in very large-scale data centers. The sheer scale of these deployments brings a new challenge to the RAS aspects of the system design. Traditionally infrequent errors may become more visible as the aggregate volume of memory components and data traffic continues to increase. Any corner-case event due to material degradation, environmental impacts, or manufacturing defects may affect the availability or performance of the systems. To mitigate the impact of memory errors on the server systems, it is desirable to have a mechanism that can detect memory errors and isolate and replace a failed component in runtime. However, the current RAS solution lacks sufficient efficiency and scalability to handle memory errors without negatively affecting the system's performance.

Although existing server systems may have the capability to identify and de-configure a failed or failing hardware component without powering off, an affected system may operate in a degraded state, which can negatively affect the performance of the system workloads until the next planned downtime.

Compute Express Link (CXL) is a high-speed, open standard interconnect technology designed to accelerate and enhance the performance of data-intensive workloads in various computing environments. CXL builds upon the foundation of the Peripheral Component Interconnect (PCI) Express (PCIe) technology and extends its capabilities to meet the growing demands of modern data-centric applications. Among many key features provided by the CXL technology (e.g., high bandwidth, support for memory expansion and pooling, support for coherent memory, being platform agnostic, etc.), the hot-plug capabilities may play an important role in the solution to effective handling of memory errors. More specifically, CXL provides support for both hot-add and hot-remove capabilities, allowing devices to be added or removed from the system without the need to reboot the system. According to some aspects of the instant application, a memory-error-recovery system can use the hot-plug capability of CXL to dynamically reassign memory resources from an equivalent memory device responsive to error detection, thus maintaining both the system's health and performance.

Figure 1:
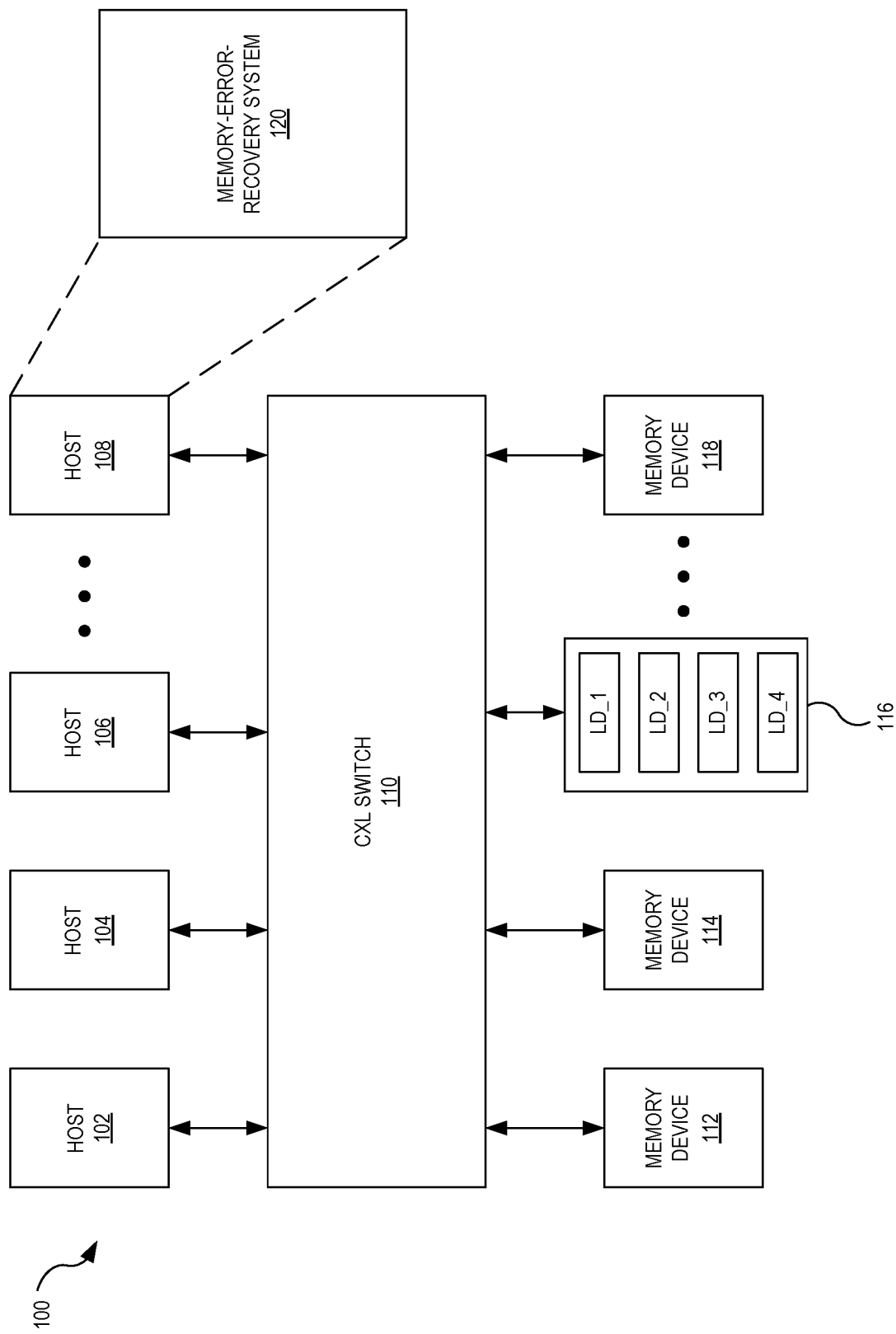
FIG. 1 illustrates an example of a Compute Express Link (CXL)-based memory system, according to one aspect of the instant application.

FIG. 1 illustrates an example of a Compute Express Link (CXL)-based memory system, according to one aspect of the instant application. In the example shown in FIG. 1, CXL-based memory system 100 can include a number of CXL-aware hosts (e.g., hosts 102, 104, 106, and 108), a CXL switch 110, and a number of CXL-enabled memory devices (e.g., memory devices 112, 114, 116, and 118). CXL-enabled memory devices are memory devices in compliance with the CXL standards.

In FIG. 1, each CXL-enabled host can include one or more central processing units (CPUs), with each CPU running a CXL-aware operating system (OS). For simplicity of illustration, individual CPUs or processors in each host are not shown in FIG. 1. Memory devices 112-118 can be Type 3 CXL memory devices attached to hosts 102-108 via CXL switch 110. Note that Type 3 CXL memory is independent of the Double Data Rate (DDR) main memory. In this example, memory devices 112, 114, and 118 are single logical devices (SLDs), and memory device 116 is a multiple logical device (MLD). Note that an SLD can be accessible to only one host at a time, whereas an MLD can be partitioned as multiple logical devices to allow multiple hosts to simultaneously access different partitions of the memory. For example, MLD 116 can be partitioned into four logical devices (LDs), such as LD_1, LD_2, LD_3, and LD_4.

CXL switch 110 can include a number of upstream ports for coupling to hosts and a number of downstream ports for coupling to memory devices. More specifically, the upstream ports can be coupled to the CXL root ports of the hosts. Although it is possible for a CXL memory device to be directly coupled to the CXL root port of a CPU, the inclusion of CXL switch 110 in memory system 100 is preferred, because CXL switch 110 can improve the system's scalability and provide support to the hot-plug of the memory devices. Note that a CXL root port can be a port on the root complex of a corresponding CPU.

According to some aspects of the instant application, a host can include a memory-error-recovery system (which is not defined by current CXL standards) that can detect and isolate memory errors and manage the runtime replacement of the error-containing memory device. For simplicity of illustration, FIG. 1 only shows that host 108 includes a memory-error-recovery system 120. In practice, it is possible that multiple hosts include a memory-error-recovery system. In one example, each host attached to CXL-based memory system 100 can include a memory-error-recovery system. Note that a host can be referred to as an entity comprising multiple devices (e.g., processor, memory and storage devices) that can collectively function as an independent server system. A host can sometimes be referred to as a host device or a host system.

Although CXL standard 2.0 defines a common set of registers and a standardized error event signaling and logging mechanism to record and report protocol, link, and device errors in a vendor-independent fashion, it does not provide a mechanism for runtime error recovery. According to some aspects, a memory-error-recovery system can take advantage of the CXL error event signaling and logging to perform error-recovery operations during runtime. More specifically, the memory-error-recovery system can receive the error signaling (e.g., in the form of interrupts, such as a System Management Interrupt (SMI) or a Message Signaled Interrupt (MSI)) from an error-containing memory device and replace the error-containing memory device during the runtime of applications with a spare memory device.

Figure 2:
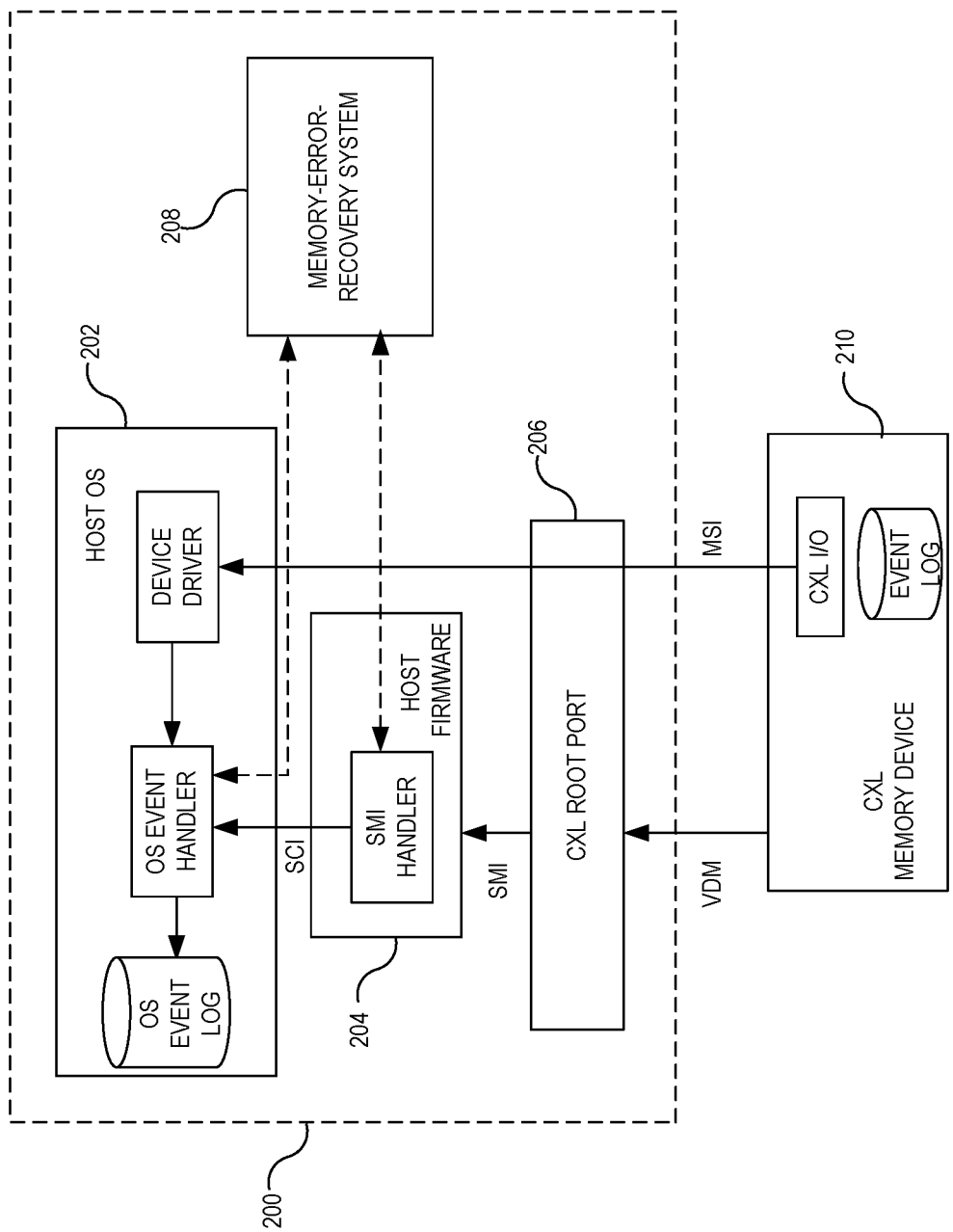
FIG. 2 illustrates example error-event signaling paths, according to one aspect of the instant application.

FIG. 2 illustrates example error-event signaling paths, according to one aspect of the instant application. In FIG. 2, a host 200 can include an operating system (OS) 202, a firmware system 204, a CXL root port 206, and a memory-error-recovery system 208. FIG. 2 also shows a CXL memory device 210 coupled to CXL root port 206 of host 200. Although it is also possible that CXL memory device 210 is coupled to host 200 via a CXL switch, FIG. 2 does not show the CXL switch.

CXL 2.0 defines two types of error-event signaling paths: a firmware-first path and an OS-first path. When the firmware-first path is used for error reporting, CXL memory device 210 can generate a VDM (Vendor Defined Message) to notify host 200 when CXL memory device 210 encounters an error. The VDM can be translated into a System Management Interrupt (SMI) and sent via CXL root port 206 to firmware system 204. The Basis Input Output System (BIOS) in firmware system 204 receives the SMI, which causes the host CPU to enter a System Management Mode (SMM). Once in the SMM, the SMI handler in firmware system 204 can perform error-specific handling, log the Common Platform Error Record (CPER), and propagate the error records to host OS 202 via ACPI (Advanced Configuration and Power Interface) GHESS (Generic Hardware Error Source Structure) tables (e.g., by triggering a System Control Interrupt (SCI)).

When the OS-first path is used for error signaling or reporting, in response to detecting a memory error, CXL memory device 210 can generate a Message Signaled Interrupt (MSI) that can be directly handled by the memory device driver and the OS event handler in host OS 202. In this situation, firmware system 204 is completely bypassed and unaware of any error occurrence.

Memory-error-recovery system 208 can perform the memory-error-recovery operation (e.g., dynamically reassign memory resources) regardless of whether the error reporting is performed using the firmware-first approach or the OS-first approach. According to some aspects, memory-error-recovery system 208 can work with the SMI handler in firmware system 204 or the OS event handler in host OS 202 to perform the error-recovery operation.

According to some aspects of the instant application, in response to detecting a memory device is failing or failed, memory-error-recovery system 208 can hot-swap the failing or failed memory device with a spare memory device, which can be selected from a memory resource pool and have a capacity comparable or larger than the failing or failed memory device.

Figure 3A:
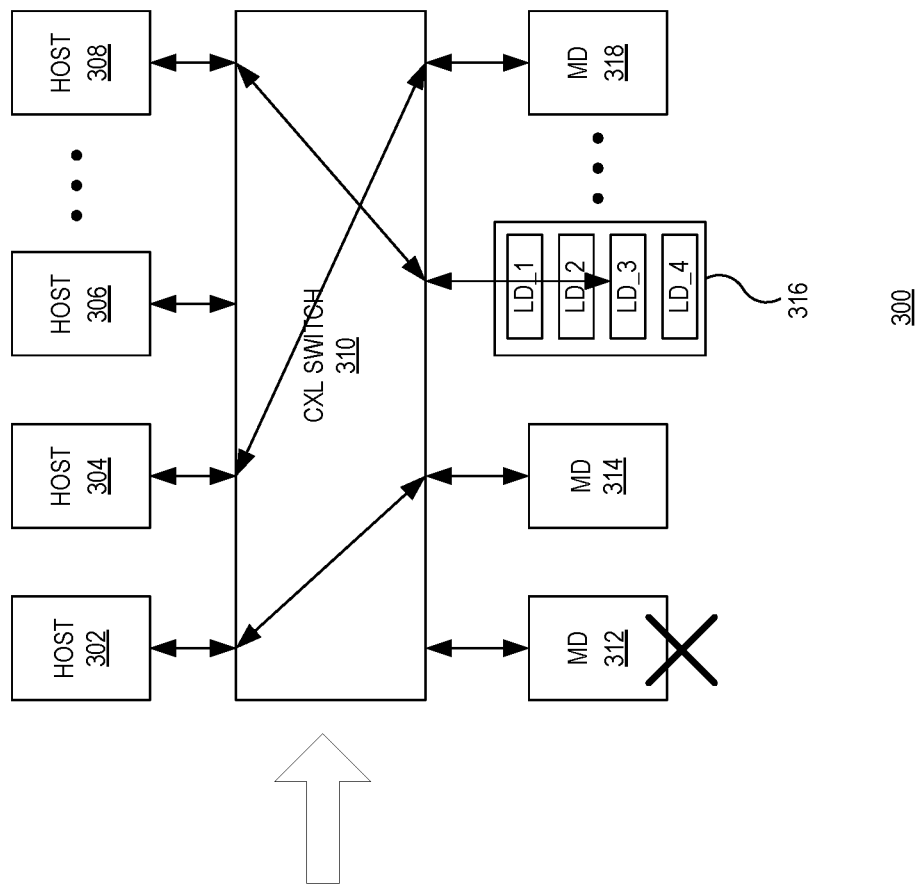
FIG. 3A illustrates an example memory-error-recovery scenario, according to one aspect of the instant application.
Figure 3A:
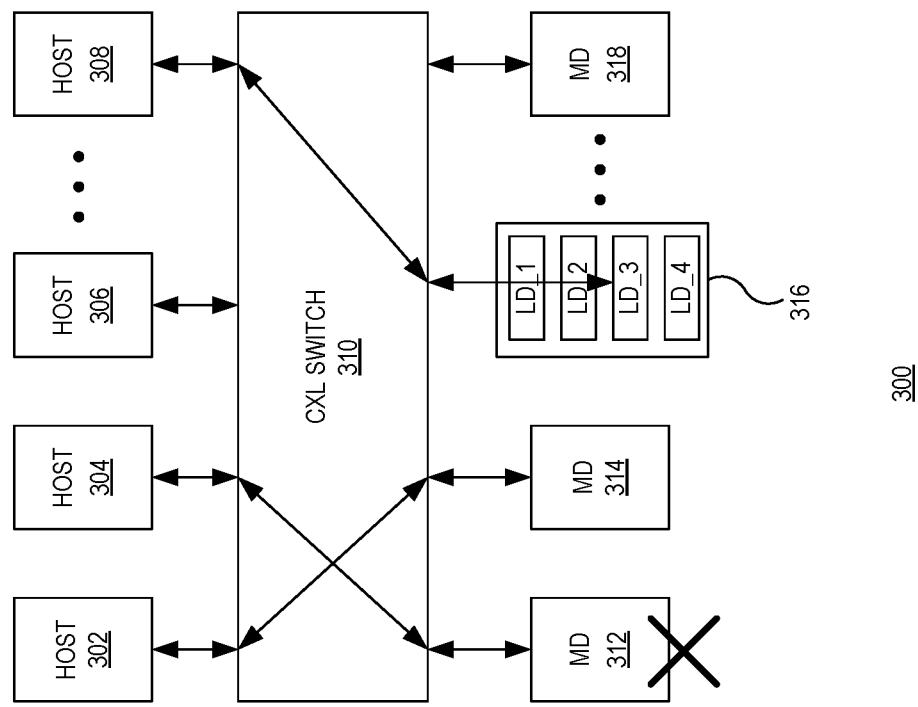

FIG. 3A illustrates an example memory-error-recovery scenario, according to one aspect of the instant application. The left drawing of FIG. 3A shows a CXL-based memory system 300, which includes a number of CXL-enabled hosts (e.g., hosts 302, 304, 306, and 308), a CXL switch 310, and a number of CXL memory devices (e.g., memory devices 312, 314, 316, and 318). In this example, memory devices 312, 314, and 318 are SLDs, and memory device 316 is an MLD. More specifically, memory device 312 is associated with host 304, memory device 314 is associated with host 302, and LD_3 on memory device 316 is associated with host 308. Memory device 318 can be a spare device, meaning that it is not associated with any host.

The left drawing of FIG. 3A also shows that memory device 312 may be failing or failed. A memory device is considered failing if it includes correctable errors that can be persistent due to the degraded state of the memory. A memory device is considered failed if it includes uncorrectable errors. Note that the error handlers in the host can effectively differentiate persistent errors from transient ones to minimize the interference of other environmental factors that can lead to false positives.

In response to detecting that memory device 312 is failing or has failed, the error-recovery-system in host 304 may perform an error-recovery operation, which comprises replacing failing or failed memory device 312 with a non-fault spare device. In this example, memory device 318 can be a spare device that is substantially equivalent to memory device 312 (meaning that they have similar capacity). Hence, the memory-error-recovery system may select memory device 318 as a replacement for faulty memory device 312. The right drawing of FIG. 3A shows the result of the error-recovery operation. In the right drawing, host 304 is disassociated from faulty memory device 312 and is now associated with memory device 318.

Figure 3B:
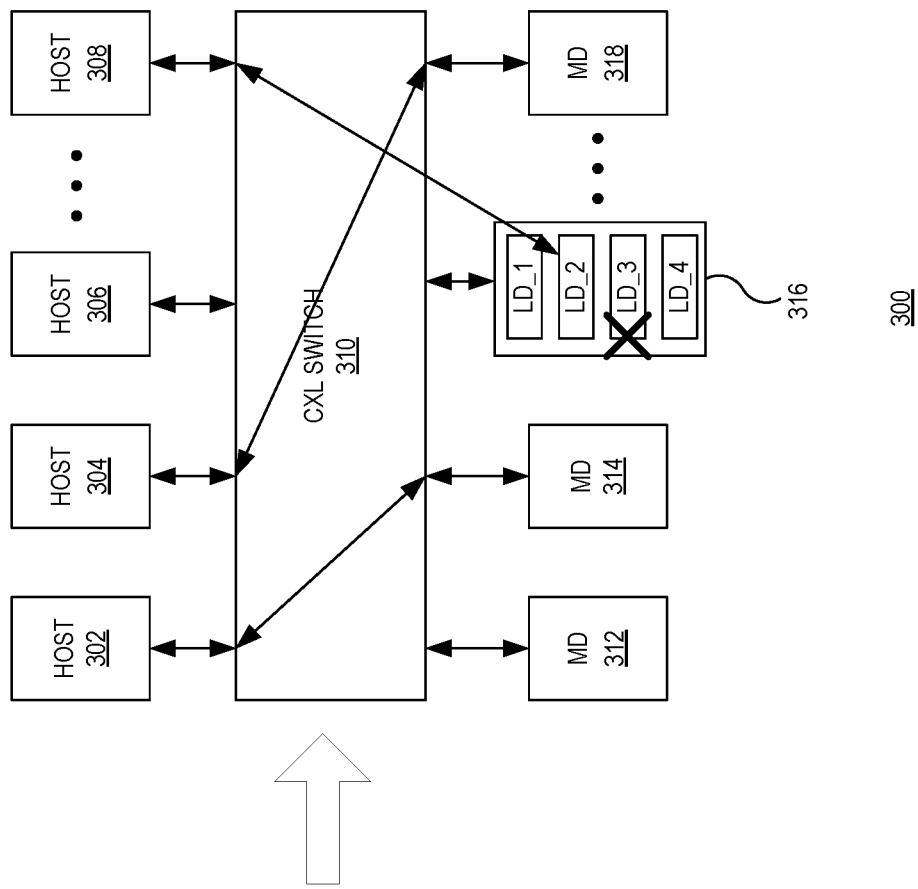
FIG. 3B illustrates an example memory-error-recovery scenario, according to one aspect of the instant application.
Figure 3B:
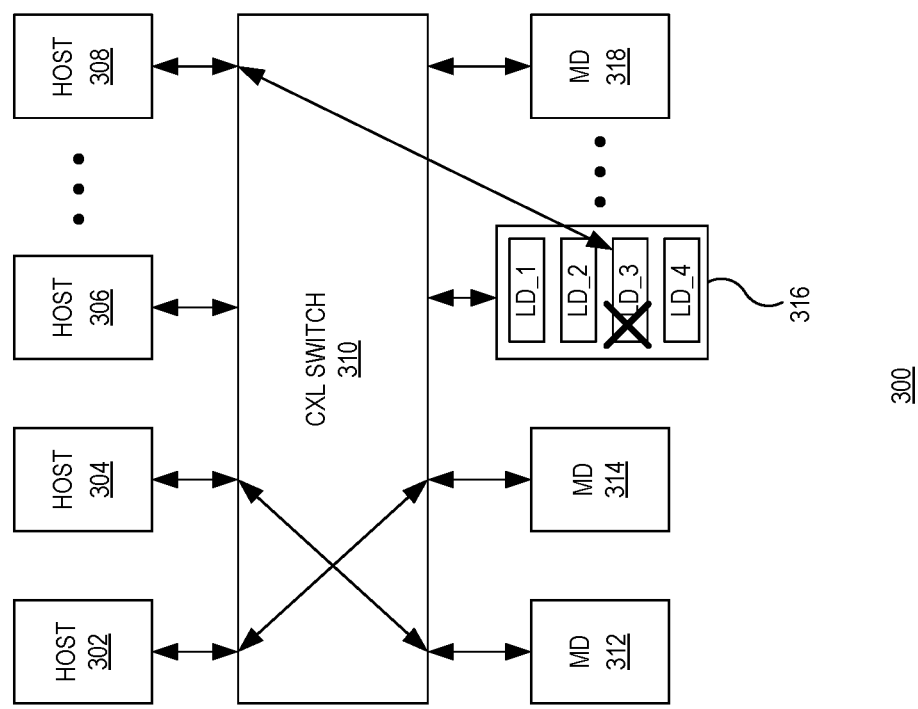

FIG. 3B illustrates an example memory-error-recovery scenario, according to one aspect of the instant application. In this example, the left drawing shows that LD_3 of MLD 316 is faulty. The right drawing shows that, after the error-recovery operation, LD_3 is replaced with an equivalent memory device LD_2. More specifically, host 308 is disassociated from the faulty memory device LD_3 and associated with the replacement memory device LD_2.

According to some aspects of the instant application, when an error occurs on a memory device, the error can be reported to the host device currently owning the memory device. The error handler in the host can effectively isolate the error to a specific device. For example, the host may be associated with multiple CXL memory devices, and in response to receiving an error message (e.g., an SMI message if the firmware-first path is taken or an MSI message if the OS-first path is taken), the error handler in the host (which can be a software subsystem in the host OS or a firmware subsystem) can identify, from the multiple memory devices, the error-containing memory device.

Once the host detects that a coupled memory device (which can be an SLD or an MLD) has failed or is failing, the memory-error-recover system in the host device can trigger a recovery flow that includes hot-adding an equivalent memory device from a resource pool comprising spare or standby memory devices, seamlessly migrating data from the faulty memory device to the hot-added device, and replicating the host physical address (HPA) address-mapping from the faulty memory device to the hot-added memory device. After the data has been successfully migrated, the host can be disassociated from the faulty memory device, and the replication of the address mapping would ensure that memory transactions targeting the HPA range, which was originally mapped to the disassociated faulty memory device, can be routed to the hot-added memory device.

Figure 4:
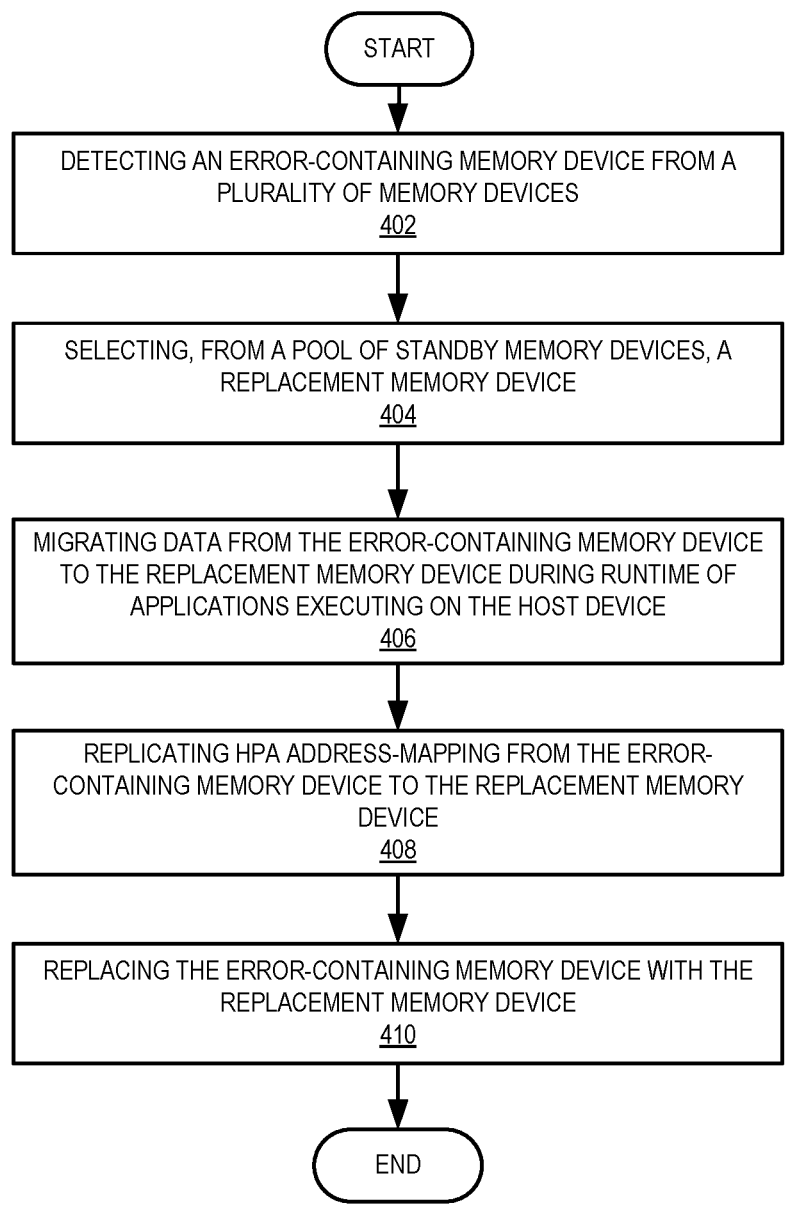
FIG. 4 presents a flowchart illustrating an example process for replacing a faulty memory device in runtime, according to one aspect of the instant application.

FIG. 4 presents a flowchart illustrating an example process for replacing a faulty memory device in runtime, according to one aspect of the instant application. During operation, a host device associated with a plurality of memory devices can detect an error-containing memory device from the plurality of memory devices (operation 402). The host device can implement a CXL-aware OS and the plurality of memory devices can be CXL enabled. In some examples, the memory devices can be coupled to the host device via a CXL switch that comprises a plurality of upstream ports for coupling to hosts and a plurality of downstream ports for coupling to memory devices. The memory devices can include SLDs, MLDs, or both. A host device coupled to the CXL switch can be associated with (or can own) one or more memory devices. The plurality of memory devices coupled to the switch can also include spare or standby devices not yet activated or used by any host. According to some aspects, the host device detects the error-containing memory device based on an interrupt generated by the memory device when it encounters an error. If the memory device implements the firmware-first approach to report the error, it can generate a VDM, which can be converted (e.g., by the host CXL Root Bridge) into an SMI, and the host firmware SMI handler can perform error handling, log the CPER record in the firmware, and propagate the error record to the host OS. If the memory device implements the OS-first approach to report the error, it can generate and send an MSI to the host OS.

The host device can select, from a pool of standby memory devices, a replacement memory device (operation 404). According to some aspects, the selected replacement memory device can be similar to the error-containing memory device. For example, if the error-containing memory device is an SLD, the replacement memory device can be an SLD; if the error-containing memory device is an LD within an MLD, the replacement memory device can be an LD in the same MLD or a different MLD. The capacity of the replacement memory device can be similar to or greater than the error-containing memory device. When the host device is coupled to multiple memory devices, in response to receiving the interrupt message (e.g., an SMI or MSI message) associated with a memory error, the host device can determine, from the multiple coupled devices, which device sends the interrupt. The selected memory device can be hot-added, meaning that it can be activated and become accessible by the host device, without powering down the host device. CXL-enabled memory devices can provide hot-plug capabilities, and the actual operation used to hot-add a CXL memory device is beyond the scope of this disclosure and will not be described in detail.

The host device can migrate data from the error-containing memory device to the replacement memory device during the runtime of the applications executing on the host device (operation 406). Before the error-containing memory device can be replaced, its content should be moved to the replacement memory device such that applications running on the host device can continue to access their data after the replacement of the error-containing memory device. More specifically, the memory-error-recover operation or the swapping of the memory devices can be transparent to applications running on the host device. Moreover, to reduce interruptions to the application workloads on the host device, data migration can occur during the runtime of the applications. While data is copied from the error-containing device to the replacement device, the applications running on the host device can continue to access the error-containing device, including reading data from and writing data to the error-containing memory device. Because data migration occurs during runtime and the data may be modified constantly, special management of the data-migration process can be used to ensure that the migrated data remains up to date. According to some aspects, the migration of data can include an iterative process that updates the data on the replacement device in response to detecting that the data is modified on the error-containing device. Moreover, to prevent data conflict, the replacement memory device should not be accessed by the host device during data migration.

After the data migration, the memory-error-recovery system in the host device can replicate the HPA address-mapping from the error-containing memory device to the replacement memory device (operation 408). The HPA is the native physical address space of memory device viewed by the host. Replicating the HPA address-mapping can ensure that the same HPA range from the error-containing memory device can be used to remap the replacement device such that there is no change to the HPA ranges already exposed to the host OS. According to some aspects, the memory-error-recovery system (or more particularly, the SMI handler in the system) can program all HDM decoders in the CXL hierarchy of the replacement memory device based on the HDM decoders in the CXL hierarchy of the error-containing memory device.

The HDM decoders in the CXL hierarchy can include the HDM decoders along a CXL path from the host device to the memory device, including an HDM decoder in the CXL root port, an HDM decoder in the CXL switch, and an HDM decoder in the CXL memory device. For example, to map the HPA to an address on a CXL memory device, the HDM decoder in the CXL root port can map the HPA to an upstream port of the CXL switch, the HDM decoder in the CXL switch can map the upstreaming port to a downstream port, and the HDM decoder in the memory device coupled to the downstream port can map the HPA to an address on the memory device. Replicating the HPA address-mapping means overlaying the address range contributed from the error-containing memory device with the address space of the replacement memory device.

The memory-error-recovery system in the host device can then replace the error-containing memory device with the replacement memory device (operation 410). According to some aspects, after the replication of the address mapping, the memory-error-recovery system can disassociate the error-containing memory device from the host device, and the SMI handler that places the CPUs in the process-freezing state can exit the freezing state and resume running the application workloads. Subsequent memory transactions targeting the HPA range will now be routed to the replacement memory device.

Figure 5:
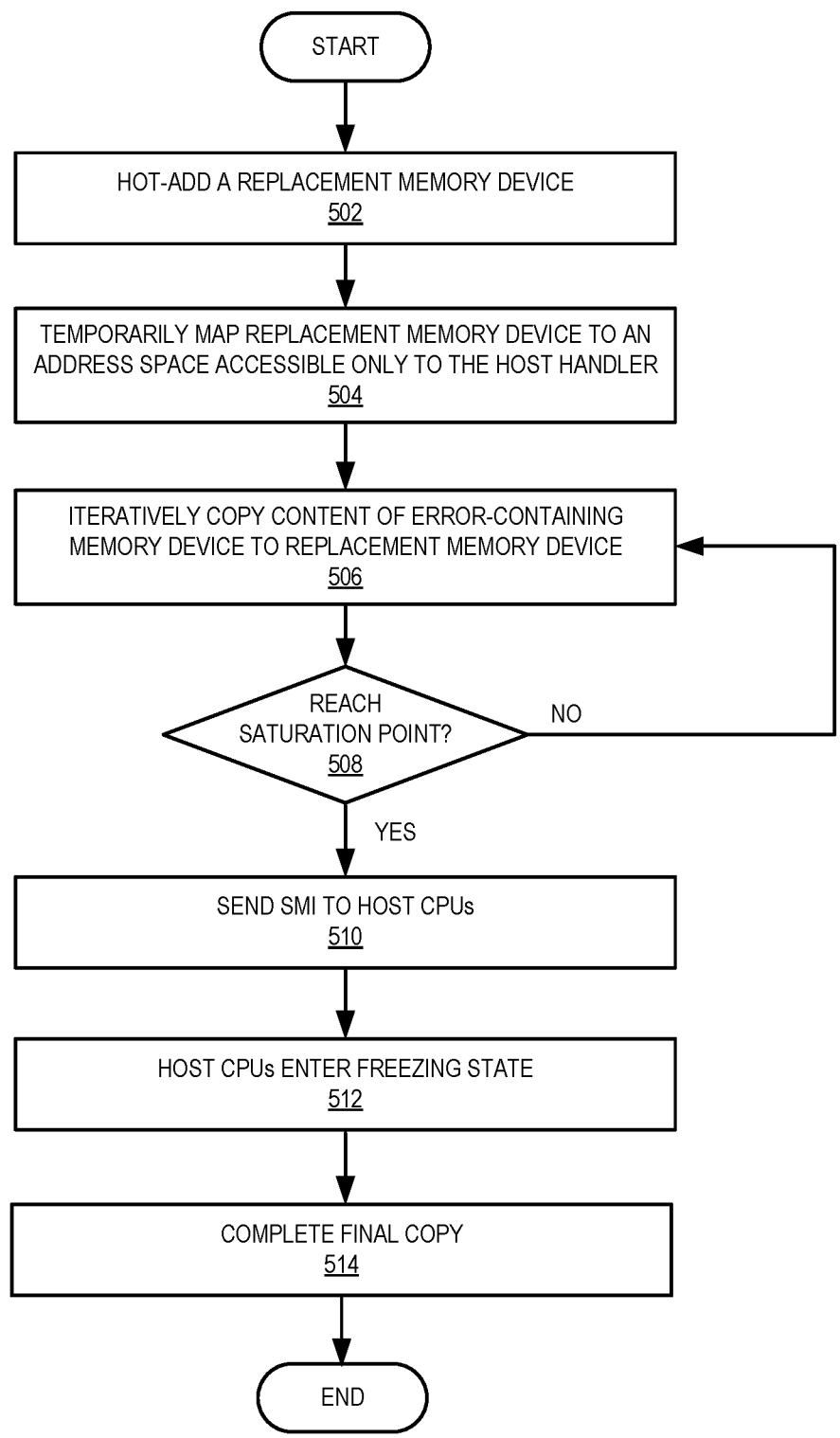
FIG. 5 presents a flowchart illustrating an example data-migration process, according to one aspect of the instant application.

FIG. 5 presents a flowchart illustrating an example data-migration process, according to one aspect of the instant application. During operation, the memory-error-recovery system on the host device can hot-add a replacement memory device (operation 502). As discussed previously, the memory-error-recovery system can hot-add the replacement memory device in response to receiving a report message regarding an error detected on a memory device. The memory-error-recovery system can temporarily map the replacement memory device to an address space that can be accessed only by a special error handler (also referred to as a host handler) in the memory-error-recovery system (operation 504). This can prevent applications running on the host device from accessing the replacement memory device before their data has been migrated successfully. According to some aspects, the host handler has exclusive rights to the replacement memory device during data migration and can include a software unit running in the OS or firmware context. The host handler can have the capability to perform the iterative data-copy operation to copy content from the error-containing memory device into the temporarily mapped address space of the replacement memory device. According to some aspects, the host handler can also offload the data-copy operation to a hardware circuit, which can perform the iterative copy in the background when the workloads in the host device are still active.

The memory-error-recovery system can iteratively copy the content of the error-containing memory device to the replacement memory device (operation 506). Each iteration can include selecting a set of memory blocks on the error-containing memory device and copying their content to the replacement memory device. According to some aspects, the host handler in charge of the data copying can be equipped with control logic to detect modified memory blocks after each iteration and re-copy the modified memory blocks in subsequent iterations. A modified memory block refers to a memory block that is modified after its content has been copied to the replacement memory device. Because the application workloads running in the host device continuously access (e.g., read from and write to) the error-containing memory device during the data migration process, some memory blocks may be modified and recopied multiple times.

Because the error-containing memory device may be in a degraded state, there can be further errors reported when the host handler is performing the data-copy operation. For example, an error can be reported when the host handler accesses a bad block. According to some aspects, the host handler (e.g., the SMI handler when the firmware-first approach is used or the CXL memory driver/event handler when the OS-first approach is used) in the memory-error-recovery system can be enhanced to detect such scenarios to recognize that the error is responsive to a recovery action. For each error triggered by the recovery operation, the memory-error-recovery system can mask further propagation of error signaling to the higher-level layer that processes error. In the case of uncorrected errors where the data stored in the bad block cannot be recovered, the host handler can label the destination block on the replacement memory device as corrupted or poisoned.

The memory-error-recovery system can determine whether a data-copying saturation point is reached (operation 508). The continuous access of the application workloads to the error-containing memory device means that modified memory blocks may be generated during each iteration. However, the data copying cannot be repeated forever. The memory-error-recovery system may choose to stop the data copying after reaching the saturation point. According to some aspects, the saturation point may be based on a lower threshold of the leftover modified blocks (i.e., modified blocks that are yet to be recopied), a maximum iteration loop count, or both. In one example, the host handler can keep track of the total number of the leftover modified blocks, and the saturation point is reached when such a number is equal to or less than a predetermined first threshold number. In another example, the host handler can count the total number of iterations, and the saturation point is reached when such a number reaches a predetermined second threshold number. In yet another example, the saturation point is reached when both conditions are met (i.e., the number of leftover modified blocks is equal to or less than the predetermined first threshold and the total number of iterations reaches the predetermined second threshold). If the saturation point is not yet reached, the iterative copying of the data from the error-containing device to the replacement device continues (operation 506).

If the data-copying saturation point has been reached, the memory-error-recovery system can send an SMI to CPUs in the host (operation 510). For example, if the data copying is offloaded to hardware logic, the data-copying hardware circuit can send an SMI to the host handler. In response to the SMI, all CPUs in the host can enter a "process-freezing" state or "freezing" state for short (operation 512). In the freezing state, no OS or application workload is running on the CPUs and, hence, accessing the memory. In other words, all host CPUs rendezvous inside the firmware SMI handlers and are not available to run any workload. This can prevent further modifications of the data in the error-containing memory device.

The memory-error-recovery system can complete the final data-copy operation to copy the leftover modified blocks to the replacement memory device (operation 514). Because the final copy is made during the process-freezing state, the content of the error-containing memory device is unchanged during copying. After the completion of the final data-copy operation, data content on the replacement memory device can be identical to that of the error-containing memory device. This iterative data-copying process can allow the workloads to stay alive during the data migration phase. By reducing the time during which the CPUs remain in the process-freezing state, the system can avoid any repercussion timeouts including memory access or workload-specific timeouts.

Although the example processes shown in FIGS. 4 and 5 demonstrate a specific order of performing certain functionalities, the actual processes are not limited to such order. For example, the functionalities shown in succession in the flowcharts may be performed in a different order, may be executed concurrently, or with partial concurrence or combinations thereof.

Figure 6:
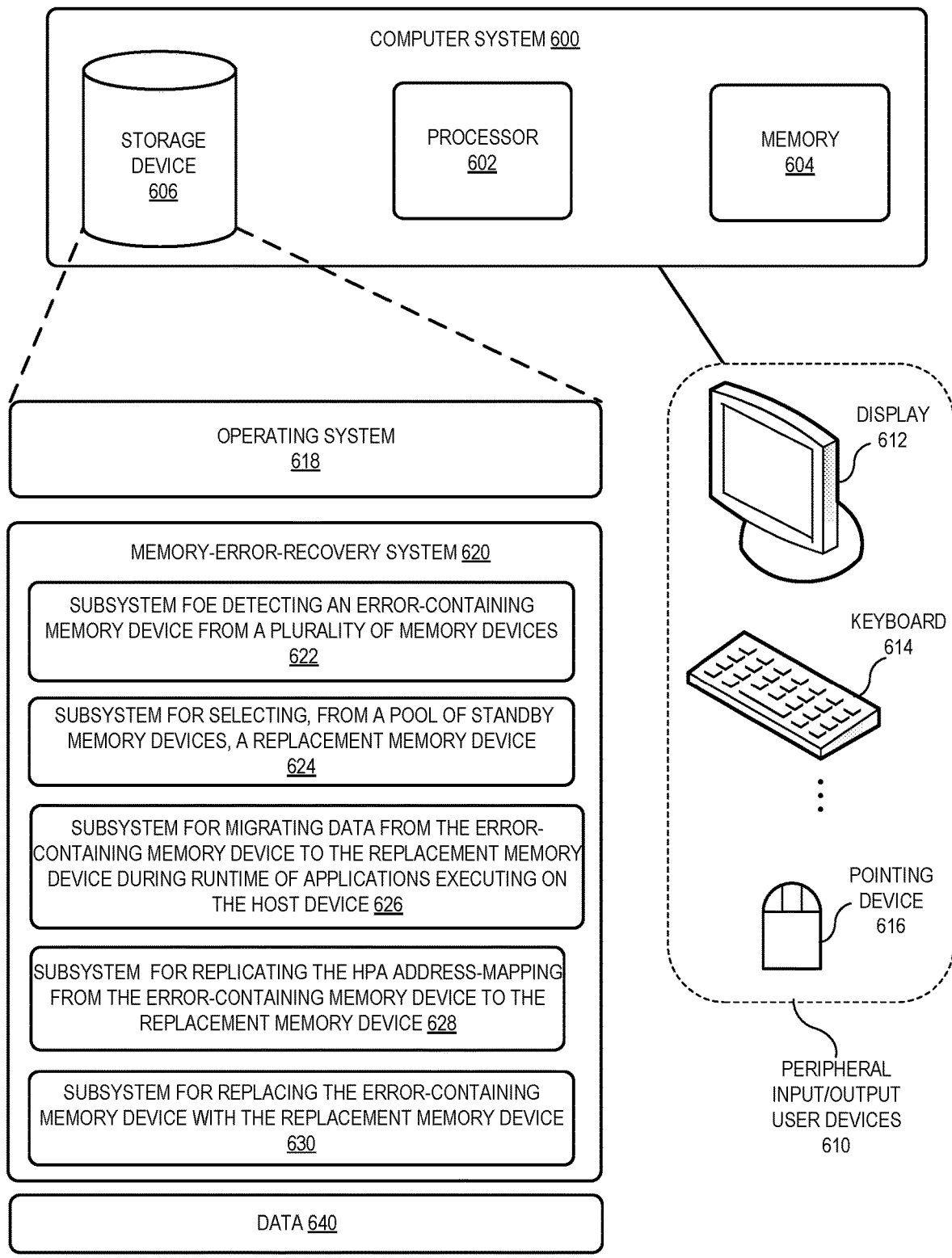
FIG. 6 illustrates an example of a computer system that facilitates the memory-error-recovery operations, according to one aspect of the instant application.

FIG. 6 illustrates an example of a computer system that facilitates the memory-error-recovery operations, according to one aspect of the instant application. Computer system 600 can include a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a memory-error-recovery system 620, and data 640. According to some aspects, computer system 600 can be implemented as part of a host in a CXL memory system (e.g., CXL memory system 100 shown in FIG. 1).

Memory-error-recovery system 620 can include instructions, which when executed by computer system 600, can cause computer system 600 or processor 602 to perform methods and/or processes described in this disclosure, such as the methods and/or processes shown in FIGS. 4 and 5. Specifically, by executing these instructions, computer system 600 can achieve the goal of dynamically replacing a faulty memory device with a spare memory device during runtime. Memory-error-recovery system 620 can include a subsystem for detecting an error-containing memory device from a plurality of memory devices (subsystem 622). More specifically, the memory devices can include CXL-enabled memory devices that are capable of reporting memory errors to operating system 618 using a firmware-first approach (i.e., the SMI handler in the system firmware handles the error reporting) or an OS-first approach (i.e., the event handler in the OS handles the error reporting). Regardless of the error-reporting approach, subsystem 622 can determine, based on a received interrupt message (e.g., SMI or MSI), which coupled memory device is faulty or contains error.

Memory-error-recovery system 620 can include a subsystem for selecting, from a pool of standby memory devices, a replacement memory device (subsystem 624). The selected memory device should have a memory capacity that is equal to or greater than that of the faulty memory device.

Memory-error-recovery system 620 can include a subsystem for migrating data from the error-containing memory device to the replacement memory device during runtime of applications executing on the host device (subsystem 626). More specifically, during data migration, the OS or application workloads can continue to run in computer system 600. During data migration, subsystem 626 can recopy modified memory blocks to the replacement system until a saturation point is reached. In response to reaching the saturation point, the SMI handler can place all CPUs in a freezing state to prevent the further modification of the data and then perform a final copy operation to make sure that the replacement memory device has an up-to-date copy of all data in the faulty memory device.

Memory-error-recovery system 620 can include a subsystem for replicating the HPA-address mapping from the error-containing memory device to the replacement memory device (subsystem 628). More specifically, subsystem 628 can program all HDM decoders in the CXL hierarchy of the replacement memory device based on the HDM decoders in the CXL hierarchy of the faulty memory device to ensure that the same HPA range from the faulty device is being used to remap the replacement device. Memory-error-recovery system 620 can further include a subsystem for replacing the error-containing memory device with the replacement memory device (subsystem 630). Data 640 can include any data that is required as input or that is generated as output by the methods and/or processes described in this disclosure.

While FIG. 6 depicts memory-error-recovery system 620 with subsystems 622-630 which may be implemented in software, the described aspects of the memory-error-recovery system are not limited to software and may also be implemented in the hardware of an apparatus. Such an apparatus can comprise a plurality of units or apparatuses which may communicate with one another via a wired, wireless, quantum light, or electrical communication channel. Such an apparatus may be realized using one or more integrated circuits and may include fewer or more units or apparatuses than those shown in FIG. 6. Further, such an apparatus may be integrated into a computer system, or realized as a separate device which is capable of communicating with other computer systems and/or devices.

Figure 7:
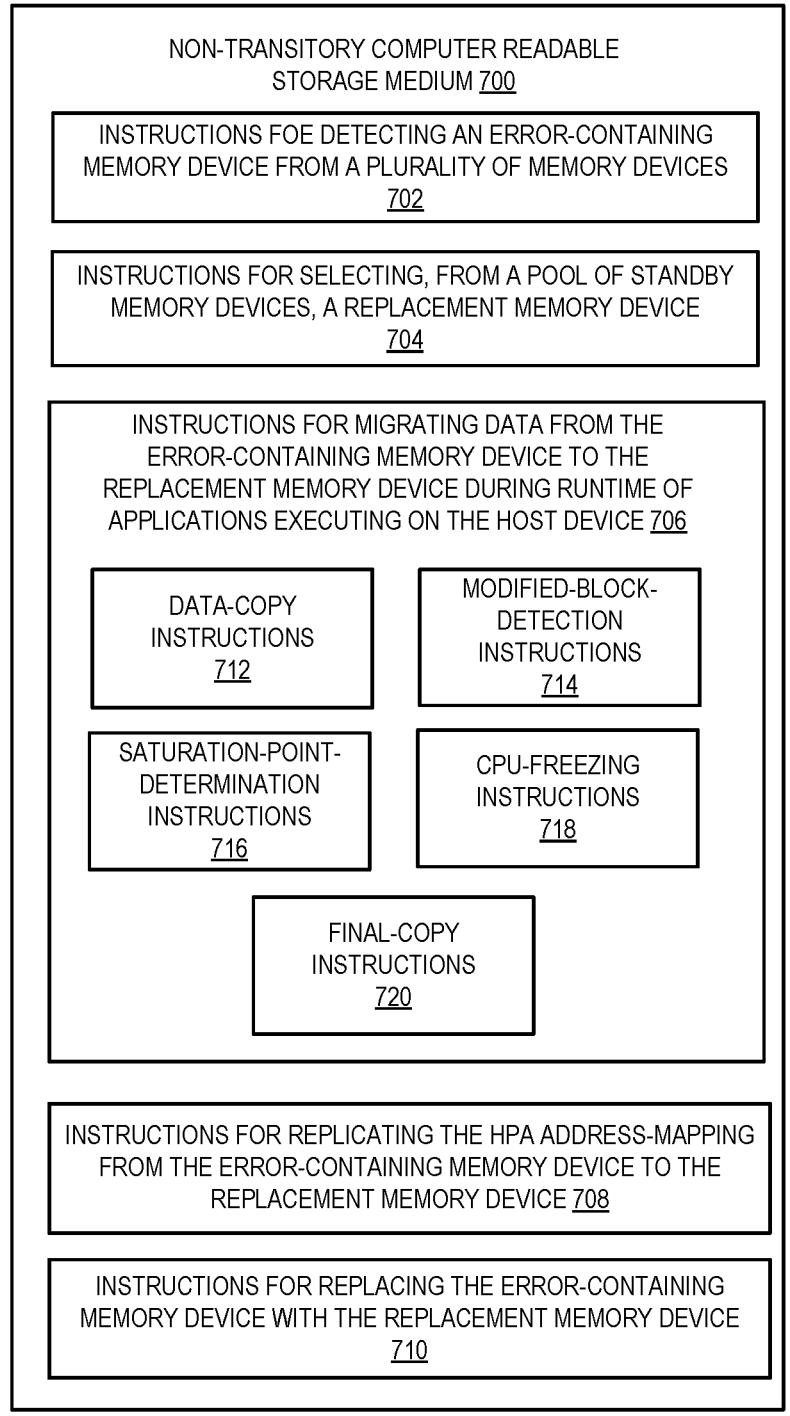
FIG. 7 illustrates an example of a non-transitory computer-readable medium, according to one aspect of the instant application.

FIG. 7 illustrates an example of a non-transitory computer-readable medium, according to one aspect of the instant application. Non-transitory computer-readable medium 700 can store executable instructions for runtime replacement (or hot swapping) of a faulty CXL memory device. According to some aspects, non-transitory computer readable medium 700 can be associated with or accessible to a host in a CXL memory system (e.g., CXL memory system 100 shown in FIG. 1). The host can execute the instructions stored in computer readable medium 700 to perform methods and/or processes described in this disclosure, such as the methods and/or processes shown in FIGS. 4 and 5.

Non-transitory computer-readable medium 700 can store instructions for detecting an error-containing memory device from a plurality of memory devices (instructions 702), instructions for selecting, from a pool of standby memory devices, a replacement memory device (instructions 704), instructions for migrating data from the error-containing memory device to the replacement memory device during runtime of applications executing on the host device (instructions 706), instructions for replicating the HPA-address mapping from the error-containing memory device to the replacement memory device (instructions 708), and instructions for replacing the error-containing memory device with the replacement memory device (instructions 710).

Instructions 706 can include instructions for copying data or memory block from the error-containing device to the replacement device (data-copy instructions 712), instructions for detecting memory blocks that are modified after each copy iteration (modified-block-detection instructions 714), instructions for determining whether a saturation point has been reached during data copying (saturation-point-determination instructions 716), instructions for placing the CPUs in a freeze state to prevent workloads running on the CPUs from modifying the memory blocks further (CPU-freezing instructions 718), and instructions for performing the final copy operation (final-copy instructions 720).

Non-transitory machine-readable storage medium 700 may be implemented in a single device or distributed across devices. Non-transitory machine-readable storage medium 700 may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof.

In general, the disclosure describes a CXL-based memory system that can replace a failed memory device during the runtime of workloads of the host device. To reduce the disruptions to the workloads, the proposed solution can use existing CXL features such as memory-error event logging and signaling and hot-plug capability. When the host detects a persistent error on a coupled CXL memory device, the host can trigger a recovery process to hot-add an equivalent or larger memory device from a pool of spare memory devices as a replacement for the error-containing device. A host handler (which can include software, hardware, or both) can seamlessly migrate data from the error-containing device to the replacement device, while the OS/application workloads continue to run in the host device. During data migration, the memory capacity of the replacement device can be temporarily mapped into an address space accessible only to the host handler. When a data-copy saturation point is reached (e.g., the number of leftover modified blocks below a threshold or the number of iterations exceeding a threshold), the CPUs can enter a freeze state to prevent the workloads from further updating the memory. During the freeze state, the host handler performs a final copy of the leftover modified memory blocks. After the final copy, the memory capacity of the replacement memory device can be mapped to the same HPA range as that of the error-containing memory device. The host can then be disassociated from the error-containing memory device, and the CPUs resume running the workloads. Subsequent memory transactions in that HPA range would be routed to the replacement memory device.

Because the proposed solution leverages existing memory error detection and signaling mechanisms provided by the CXL technology, it can be easily adapted to the current ecosystems. Moreover, the proposed solution can eliminate the need to lock up redundant memory resources at the deployment phase and can dynamically select the replacement memory device from the pooled resources.

One aspect of the instant application can provide a system and method for replacing a faulty or failing memory device during runtime. During operation, a host device of a plurality of coupled memory devices can detect an error-containing memory device and select, from a pool of standby memory devices, a replacement memory device. The host device can migrate data from the error-containing memory device to the replacement memory device during runtime of applications executing on the host device, replicate host physical address (HPA) address-mapping from the error-containing memory device to the replacement memory device, and replace the error-containing memory device with the replacement memory device.

In a variation on this aspect, the plurality of memory devices and the pool of standby memory devices are Compute Express Link (CXL) enabled, and the host can be coupled to the plurality of memory devices and the pool of standby memory devices via a CXL switch.

In a further variation, replicating the HPA address-mapping can include programming host-managed device memory (HDM) decoders in a CXL hierarchy of the replacement memory device according to HDM decoders in a corresponding CXL hierarchy of the error-containing memory device.

In a further variation, detecting the error-containing memory device can include receiving an interrupt message from the error-containing memory device on a firmware-first error-reporting path or an operating system (OS)-first error-reporting path.

In a variation on this aspect, migrating the data can include mapping the replacement memory device to an address space accessible to a special error handler in the host device and inaccessible to the applications running on the host device and iteratively copying content in the error-containing memory device to the replacement memory device.

In a further variation, iteratively copying the content can include recopying content of a memory block in response to determining that the content of the memory block has been modified subsequent to a previous iteration.

In a further variation, migrating the data can further include in response to a data-copying saturation point being reached, entering a process-freezing state to prevent the applications running on the host device from accessing the error-containing memory device and copying remaining modified memory blocks from the error-containing memory device to the replacement memory device.

In a further variation, the data-copying saturation point can be associated with a number of iterations, a number of remaining modified memory blocks, or both.

In a further variation, the host device can offload the iterative copying to a hardware circuit and receive an interrupt message from the hardware circuit responsive to the data-copying saturation point being reached.

One aspect of the instant application can provide a computer system that includes a host, a plurality of memory devices associated with the host, and a pool of standby memory devices. The host can include a processor and a storage device storing instructions that when executed by the processor cause the processor to perform a method. The method can include: detecting, from the plurality of memory devices associated with the host, an error-containing memory device; selecting, from the pool of standby memory devices, a replacement memory device; migrating data from the error-containing memory device to the replacement memory device during runtime of applications executing on the host; replicating host physical address (HPA) address-mapping from the error-containing memory device to the replacement memory device; and replacing the error-containing memory device with the replacement memory device.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
   detecting, by a host device of a plurality of Compute Express Link (CXL)-enabled memory devices, an error-containing memory device;
   selecting, from a pool of CXL-enabled standby memory devices, a replacement memory device, the host communicatively coupled to the plurality of CXL-enabled memory devices and the pool of CXL-enabled standby memory devices via a CXL switch;
   migrating data from the error-containing memory device to the replacement memory device during runtime of applications executing on the host device;
   replicating host physical address (HPA) address-mapping from the error-containing memory device to the replacement memory device by overlaying an HPA address range of the error-containing memory device with an address space of the replacement memory device; and
   replacing the error-containing memory device with the replacement memory device.

2. The method of claim 1, wherein replicating the HPA address-mapping further comprises programming host-managed device memory (HDM) decoders in a CXL hierarchy of the replacement memory device according to HDM decoders in a corresponding CXL hierarchy of the error-containing memory device.

3. The method of claim 1, wherein detecting the error-containing memory device comprises receiving an interrupt message from the error-containing memory device on a firmware-first error-reporting path or an operating system (OS)-first error-reporting path.

4. The method of claim 1, wherein migrating the data comprises:
   mapping the replacement memory device to an address space accessible to a special error handler in the host device and inaccessible to the applications running on the host device; and
   iteratively copying content in the error-containing memory device to the replacement memory device.

5. The method of claim 4, wherein iteratively copying the content comprises recopying content of a memory block in response to determining that the content of the memory block has been modified subsequent to a previous iteration.

6. The method of claim 4, wherein migrating the data further comprises:
   in response to a data-copying saturation point being reached, entering a process-freezing state to prevent the applications running on the host device from accessing the error-containing memory device; and
   copying remaining modified memory blocks from the error-containing memory device to the replacement memory device.

7. The method of claim 6, wherein the data-copying saturation point is associated with a number of iterations, a number of remaining modified memory blocks, or both.

8. The method of claim 6, further comprising:
   offloading the iterative copying to a hardware circuit; and
   receiving an interrupt message from the hardware circuit responsive to the data-copying saturation point being reached.

9. A computer system, comprising:
   a host;
   a plurality of Compute Express Link (CXL)-enabled memory devices associated with the host; and
   a pool of standby CXL-enabled memory devices, the host communicatively coupled to the plurality of CXL-enabled memory devices and the pool of CXL-enabled standby memory devices via a CXL switch;
   the host comprises a processor and a storage device storing instructions that when executed by the processor cause the processor to perform a method, the method comprising:
      detecting, from the plurality of memory devices associated with the host, an error-containing memory device;
      selecting, from the pool of standby memory devices, a replacement memory device;
      migrating data from the error-containing memory device to the replacement memory device during runtime of applications executing on the host;
      replicating host physical address (HPA) address-mapping from the error-containing memory device to the replacement memory device by overlaying an HPA address range of the error-containing memory device with an address space of the replacement memory device; and
      replacing the error-containing memory device with the replacement memory device.

10. The computer system of claim 9,
    wherein replicating the HPA address-mapping comprises programming host-managed device memory (HDM) decoders in a CXL hierarchy of the replacement memory device according to HDM decoders in a corresponding CXL hierarchy of the error-containing memory device.

11. The computer system of claim 9, wherein detecting the error-containing memory device comprises receiving an interrupt message from the error-containing memory device on a firmware-first error-reporting path or an operating system (OS)-first error-reporting path.

12. The computer system of claim 9, wherein migrating the data comprises:
    mapping the replacement memory device to an address space accessible to a special error handler in the host device and inaccessible to the applications running on the host device; and
    iteratively copying content in the error-containing memory device to the replacement memory device.

13. The computer system of claim 12, wherein iteratively copying the content comprises recopying content of a memory block in response to determining that the content of the memory block has been modified subsequent to a previous iteration.

14. The computer system of claim 12, wherein migrating the data further comprises:
    in response to a data-copying saturation point being reached, entering a process-freezing state to prevent the applications running on the host device from accessing the error-containing memory device; and
    copying remaining modified memory blocks from the error-containing memory device to the replacement memory device.

15. The computer system of claim 14, wherein the data-copying saturation point is associated with a number of iterations, a number of remaining modified memory blocks, or both.

16. The computer system of claim 14, wherein the method further comprises:
    offloading the iterative copying to a hardware circuit; and
    receiving an interrupt message from the hardware circuit responsive to the data-copying saturation point being reached.

17. A non-transitory computer-readable storage medium storing instructions that when executed by a processor cause the processor to perform a method, the method comprising:
    detecting, by a host device of a plurality of Compute Express Link (CXL)-enabled memory devices, an error-containing memory device;
    selecting, from a pool of CXL-enabled standby memory devices, a replacement memory device, the host communicatively coupled to the plurality of CXL-enabled memory devices and the pool of CXL-enabled standby memory devices via a CXL switch;
    migrating data from the error-containing memory device to the replacement memory device during runtime of applications executing on the host device;
    replicating host physical address (HPA) address-mapping from the error-containing memory device to the replacement memory device by overlaying an HPA address range of the error-containing memory device with an address space of the replacement memory device; and
    replacing the error-containing memory device with the replacement memory device.

18. The non-transitory computer-readable storage medium of claim 17, wherein replicating the HPA address-mapping further comprises programming host-managed device memory (HDM) decoders in a CXL hierarchy of the replacement memory device according to HDM decoders in a corresponding CXL hierarchy of the error-containing memory device.

19. The non-transitory computer-readable storage medium of claim 17, wherein migrating the data comprises:
    mapping the replacement memory device to an address space accessible to a special error handler in the host device and inaccessible to the applications running on the host device; and
    iteratively copying content in the error-containing memory device to the replacement memory device.

20. The non-transitory computer-readable storage medium of claim 19, wherein migrating the data further comprises:
    in response to a data-copying saturation point being reached, entering a process-freezing state to prevent the applications running on the host device from accessing the error-containing memory device; and
    copying remaining modified memory blocks from the error-containing memory device to the replacement memory device.

\* \* \* \* \*